United States Patent
Pratt et al.

(10) Patent No.: US 11,170,783 B2
(45) Date of Patent: Nov. 9, 2021

(54) MULTI-AGENT INPUT COORDINATION

(71) Applicant: AT&T Intellectual Property I, L.P., Atlanta, GA (US)

(72) Inventors: James Pratt, Round Rock, TX (US); Timothy Innes, Atlanta, GA (US); Eric Zavesky, Austin, TX (US); Nigel Bradley, McDonough, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 120 days.

(21) Appl. No.: 16/385,106

(22) Filed: Apr. 16, 2019

(65) Prior Publication Data

US 2020/0335106 A1    Oct. 22, 2020

(51) Int. Cl.
*G10L 15/32*     (2013.01)
*G10L 15/22*     (2006.01)
(Continued)

(52) U.S. Cl.
CPC ........ *G10L 15/32* (2013.01); *G06F 16/90332* (2019.01); *G10L 15/22* (2013.01); *G10L 15/26* (2013.01); *G10L 2015/228* (2013.01)

(58) Field of Classification Search
CPC ......... G10L 15/22; G10L 15/24; G10L 15/26; G10L 15/32; G10L 2015/226;
(Continued)

(56) References Cited

U.S. PATENT DOCUMENTS 6,519,561 B1 *   2/2003  Farrell .................. G10L 15/07
                                                         704/232
7,139,716 B1    11/2006  Gaziz
(Continued)

FOREIGN PATENT DOCUMENTS

CN    106601248    4/2017
WO    2018009397   1/2018

OTHER PUBLICATIONS

Shijia Pan, Tong Yu, Mostafa Mirshekari, Jonathon Fagert, Amelie Bonde, Ole J. Mengshoel, Hae Young Noh, and Pei Zhang, "FootprintID: Indoor Pedestrian Identification through Ambient Structural Vibration Sensing," Proceedings of the ACM on IMWU Tech., vol. 1, No. 3, Article 89. Sep. 2017 (Year: 2017).*

(Continued)

*Primary Examiner* — Paras D Shah
*Assistant Examiner* — Sean E Serraguard
(74) *Attorney, Agent, or Firm* — Guntin & Gust, PLC; Kenneth Kwan (57) ABSTRACT

Multi-agent input coordination can be used to for acoustic collaboration of multiple listening agents deployed in smart devices on a premises, improving the accuracy of identifying requests and specifying where that request should be honored, improving quality of detection, and providing better understanding of user commands and user intent throughout the premises. A processor or processors such as those in a smart speaker can identify audio requests received through at least two agents in a network and determine at which of the agents to actively process a selected audio request. The identification can make use of techniques such as location context and secondary trait analysis. The audio request can include simultaneous audio requests received through at least two agents, differing audio requests received from different requesters, or both.

20 Claims, 4 Drawing Sheets

(51) Int. Cl.
*G06F 16/9032* (2019.01)
*G10L 15/26* (2006.01)

(58) Field of Classification Search
CPC ......... G10L 2015/227; G10L 2015/228; G10L 17/00; G10L 17/02; G10L 17/04; G10L 17/06; G10L 17/10; G10L 17/14; G10L 17/26; G10L 19/0018; G10L 19/028; G10L 21/003; G10L 21/028; G06F 16/908; G06F 16/909; G06F 16/90332; G07C 9/25; G07C 9/257; G07C 9/37; G05B 2219/23386

See application file for complete search history.

(56) References Cited

U.S. PATENT DOCUMENTS

| | | | |
|---|---|---|---|
| 8,340,975 B1 | 12/2012 | Rosenberger | |
| 8,825,020 B2 | 9/2014 | Mozer et al. | |
| 9,536,540 B2 | 1/2017 | Avendano et al. | |
| 9,749,583 B1 * | 8/2017 | Fineberg | G10L 15/22 |
| 9,818,061 B1 | 11/2017 | Shams et al. | |
| 9,866,308 B1 | 1/2018 | Bultan et al. | |
| 10,074,364 B1 | 9/2018 | Wightman et al. | |
| 10,079,012 B2 | 9/2018 | Klimanis | |
| 10,102,857 B2 | 10/2018 | Mixter et al. | |
| 10,147,425 B2 | 12/2018 | Yang | |
| 10,152,969 B2 | 12/2018 | Reilly et al. | |
| 10,650,829 B2 * | 5/2020 | Kline | G06F 3/167 |
| 2012/0232886 A1 * | 9/2012 | Capuozzo | G10L 15/22 704/9 |
| 2013/0147600 A1 * | 6/2013 | Murray | G07C 9/00571 340/5.71 |
| 2015/0162006 A1 | 6/2015 | Kummer | |
| 2015/0222757 A1 * | 8/2015 | Cheatham, III | H04M 11/025 379/171 |
| 2016/0155443 A1 * | 6/2016 | Khan | G06F 1/3203 704/275 |
| 2016/0219416 A1 * | 7/2016 | Cromack | H04W 4/06 |
| 2016/0329051 A1 | 11/2016 | Rajapakse | |
| 2016/0364002 A1 * | 12/2016 | Gates | G06F 3/017 |
| 2017/0025124 A1 * | 1/2017 | Mixter | G10L 15/32 |
| 2017/0116986 A1 | 4/2017 | Weng et al. | |
| 2017/0345420 A1 | 11/2017 | Barnett, Jr. | |
| 2018/0024811 A1 | 1/2018 | De Vaan et al. | |
| 2018/0096696 A1 | 4/2018 | Mixter | |
| 2018/0133900 A1 * | 5/2018 | Breazeal | B25J 19/026 |
| 2018/0228006 A1 | 8/2018 | Baker et al. | |
| 2018/0240454 A1 | 8/2018 | Raj et al. | |
| 2018/0277107 A1 | 9/2018 | Kim | |
| 2018/0286391 A1 | 10/2018 | Carey et al. | |
| 2018/0293981 A1 | 10/2018 | Ni et al. | |
| 2019/0206395 A1 * | 7/2019 | Aoki | G10L 25/51 |
| 2019/0206396 A1 * | 7/2019 | Chen | G10L 15/30 |
| 2020/0211544 A1 * | 7/2020 | Mikhailov | G10L 13/00 |

OTHER PUBLICATIONS

Antonini et al., Smart Audio Sensors in the Internet of Things Edge for Anomaly Detection, IEEE Access, vol. 6, 2018, pp. 67594-67610.
Dokmanic, Raking the Cocktail Party, IEEE Journal of Selected Topics in Signal Processing, vol. 9, No. 5, Aug. 2015, pp. 825-836.
Moutinho et al., Indoor Global Localisation in Anchor-Based Systems Using Audio Signals, The Journal of Navigation, vol. 69, No. 5, Sep. 2016, pp. 1024-1040.
Navarro et al., Real-Time Distributed Architecture for Remote Acoustic Elderly Monitoring in Residential-Scale Ambient Assisted Living Scenarios, Sensors, vol. 18, No. 8, Aug. 1, 2018, pp. 1-22.
Quintana-Suarez et al., A Low Cost Wireless Acoustic Sensor for Ambient Assisted Living Systems, Applied Science, vol. 7, No. 9, Aug. 2017, pp. 1-15.
Shin et al., Home IoT Device Certification Through Speaker Recognition, Advanced Communication Technology (ICACT), 17th International Conference, IEEE, Jul. 1-3, 2015, pp. 600-603.

* cited by examiner

MULTI-AGENT INPUT COORDINATION

TECHNICAL FIELD

This disclosure generally relates to virtual assistants that can listen for commands or sounds and perform various control functions within an environment such as a building. More specifically, this disclosure relates to mechanisms that automatically coordinate responses and activities of multiple virtual assistant software agents being used together in or on the same premises.

BACKGROUND

A virtual assistant can be accessed through a software agent in a smart device. Examples of virtual assistants include Google Assistant™, Apple's Siri™, Amazon's Alexa™, and Microsoft's Cortana™. Deployment of multiple agents for virtual assistants, each with listening capability, is becoming increasingly common in homes and business. In some instances, these agents simultaneously record and attempt to respond user requests.

SUMMARY

In one example, a system includes a wireless communication interface and a processor communicatively coupled to the wireless communication interface, wherein the processor is configured to perform operations. The operations include identifying at least one audio request received through two or more agents in a network and determining at which of the agents to actively process a selected audio request of the at least one audio request using at least one of location context, person interaction context, or secondary trait analysis. The audio request(s) include simultaneous audio requests received through at least two of the agents, at least two differing audio requests received from different requesters, or both.

In an additional example, a method includes identifying, by a processor, at least one audio request received through at least two agents in a network and determining, by the processor, at which of the agents to actively process a selected audio request of the at least one audio request using at least one of location context or secondary trait analysis. The audio request includes simultaneous audio requests received through at least two agents, at least two differing audio requests received from different requesters, or both.

In a further example, a non-transitory computer-readable medium includes instructions that are executable by a computing device for causing the computing device to perform operations for multi-agent input coordination. The operations include identifying at least one audio request received through two or more agents in a network and determining at which of the agents to actively process a selected audio request of the at least one audio request using at least one of location context or secondary trait analysis. The audio request includes simultaneous audio requests received through at least two agents, at least two differing audio requests received from different requesters, or both.

BRIEF DESCRIPTION OF THE FIGURES

These and other features, aspects, and advantages of the present disclosure are better understood when the following Detailed Description is read with reference to the accompanying drawings.

DETAILED DESCRIPTION

Certain aspects of this disclosure relate to acoustic collaboration of multiple listening agents deployed in smart devices on a premises. This acoustic collaboration can reduce or avoid incidences of inaccurate recognition of appropriate actions and user frustration with command execution that can result when agents simultaneously record and attempt to respond to user requests. Certain aspects of this disclosure relate to improving the accuracy of identifying requests and specifying where that request should be actively processed, improving quality of detection and providing better understanding of user commands and user intent throughout the premises.

In one example, a processor carries out operations including identifying at least one audio request received through at least two agents in a network and determining at which of the agents to actively process a selected audio request using at least one of location context or secondary trait analysis. The audio request can include a simultaneous audio request received through at least two agents, at least two differing audio requests received from different requesters, or both.

In some aspects, determinations are made using secondary trait analysis including, as examples, footstep recognition, non-language-sound cadence, habit pattern analysis, or tonal context. In some aspects, determinations are made using location context, including, as examples, localization, movement, or spatial usage restrictions.

In some aspects, the processor activates an attention token at the agent at which the selected audio request is to be honored and displays an indication of the attention token. In some aspects, the processor automatically sorts ambient sounds into sound categories, and uses the sound categories to provide location context for determining where to honor the selected audio request. In aspects, actions to be taken by an agent are determined at least in part by a state machine to take into account previous audio requests and actions.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

Figure 1:
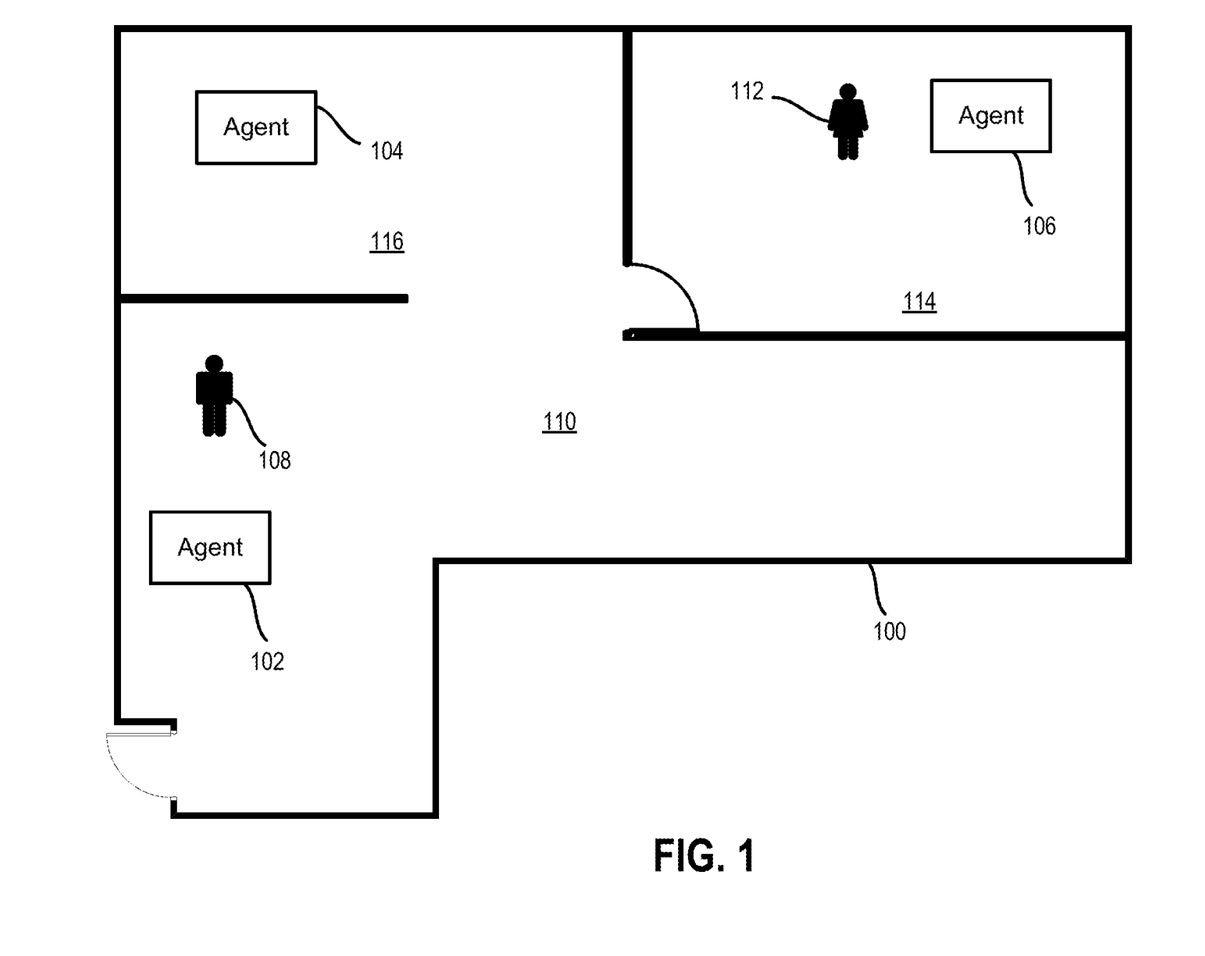
FIG. 1 is an architectural-style illustration of a multi-agent input coordination environment according to some aspects of the present disclosure.

FIG. 1 is an architectural-style illustration of a multi-agent input coordination environment (MICE) according to some aspects of the present disclosure. Premises 100 includes three listening agents. One listening agent is deployed in smart device 102, another listening agent is deployed in smart device 104, and a third listening agent is deployed in smart device 106. Requester 108 is in room 110 with smart device 102. Requester 112 is in room 114 with smart device 106. Smart device 104 is located in room 116. Nobody is present in room 114 with smart device 106. The agents in premises 100 form a local network mesh, for example, using a local wireless local area network (WLAN).

Still referring to FIG. 1, the multiple listening agents shown in premises 100 are joined in the space. Each agent can probe for others within a network or spatial location. The network can be organized as a layer running over the WLAN and can be organized as a centralized network or a mesh network. The specific examples presented assume a mesh network paradigm is used. Optionally, other audio sources that are not incorporated into smart devices can join the network as listening agents. A microphone in such a device can be dispatched to low coverage or high interference areas such as where a user cannot otherwise be heard due to high noise or distance to existing listening devices.

Figure 2:
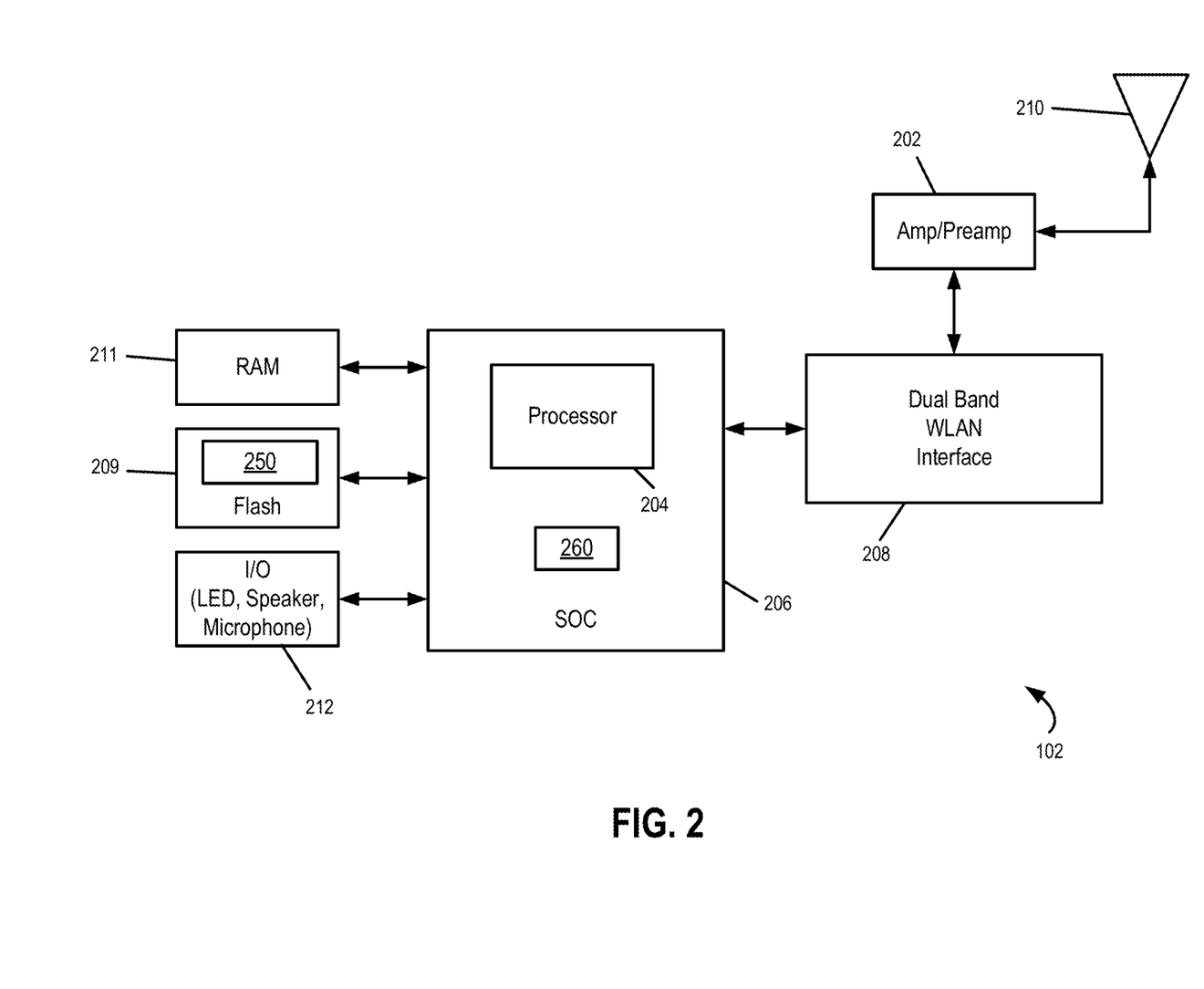
FIG. 2 is a block diagram depicting a smart device that provides multi-agent input coordination according to some aspects of the present disclosure.

FIG. 2 is a block diagram depicting the smart device 102. For purposes of this example, it can be assumed that smart device 102 is a smart speaker. Smart device 102 includes an amplification block 202 connected to antenna 210. Amplification block 202 includes a power amplifier for Wi-Fi transmission, as well as preamplifiers or amplifiers for boosting received signals. Smart device 102 also includes a processor 204, which is implemented as part of system-on-a-chip (SOC) 206. A dual-band wireless LAN (WLAN) interface block 208 is communicatively coupled to SOC 206. The dual-band WLAN interface supports the 2.4 GHz and the 5.8 GHz bands. Also included in smart device 102 is flash storage 209 and random-access memory (RAM) 211. RAM 211 can include various devices and possibly memory dedicated to specific purposes such storing encryption keys, MAC addresses, and the like for access by processor 204 when the smart device is in operation. Input/output (I/O) block 212 drives status LEDs (not shown), receives input from a microphone (now shown) and provides output to a speaker (not shown). Within the dual band WLAN interface 208, transmitted and received information can be converted to and from radio frequencies (RF), and filtering using baseband or intermediate frequency circuitry can be applied. The SOC 206 is specifically designed to implement smart speaker functions, and also performs basic signal processing, e.g., synchronization, coding and decoding.

Still referring to FIG. 2, the functions of the SOC 206 and the other aforementioned blocks can be directed and controlled by the processor 204, which can be a general-purpose microprocessor, digital signal processor (DSPs), application specific integrated circuit (ASIC). Supporting control logic can include various types of signal conditioning circuitry, including analog-to-digital converters, digital-to-analog converters, input/output buffers, etc. The flash storage 209 shown in FIG. 2 includes at least one array of non-volatile memory cells. RAM 211 includes at least one array of dynamic random-access memory (DRAM) cells. The content of the flash memory may be pre-programmed and write protected thereafter, whereas the content of other portions of the RAM may be selectively modified and/or erased. The flash memory therefore, is non-transitory computer-readable medium that is used to store operating system software or firmware, including computer program code instructions 250, which are executable by processor 204 to serve as the local MICE agent and carry out the multi-agent input coordination as described herein. Flash storage 209 can also be used to store credentials and encryption keys for longer periods. SOC 206 also contains on-board memory 260 that can serve as a non-transitory medium to store computer program code, credentials, MAC addresses, encryption keys, etc. It cannot be overemphasized that smart device 102 is but one example of a smart device.

Figure 3:
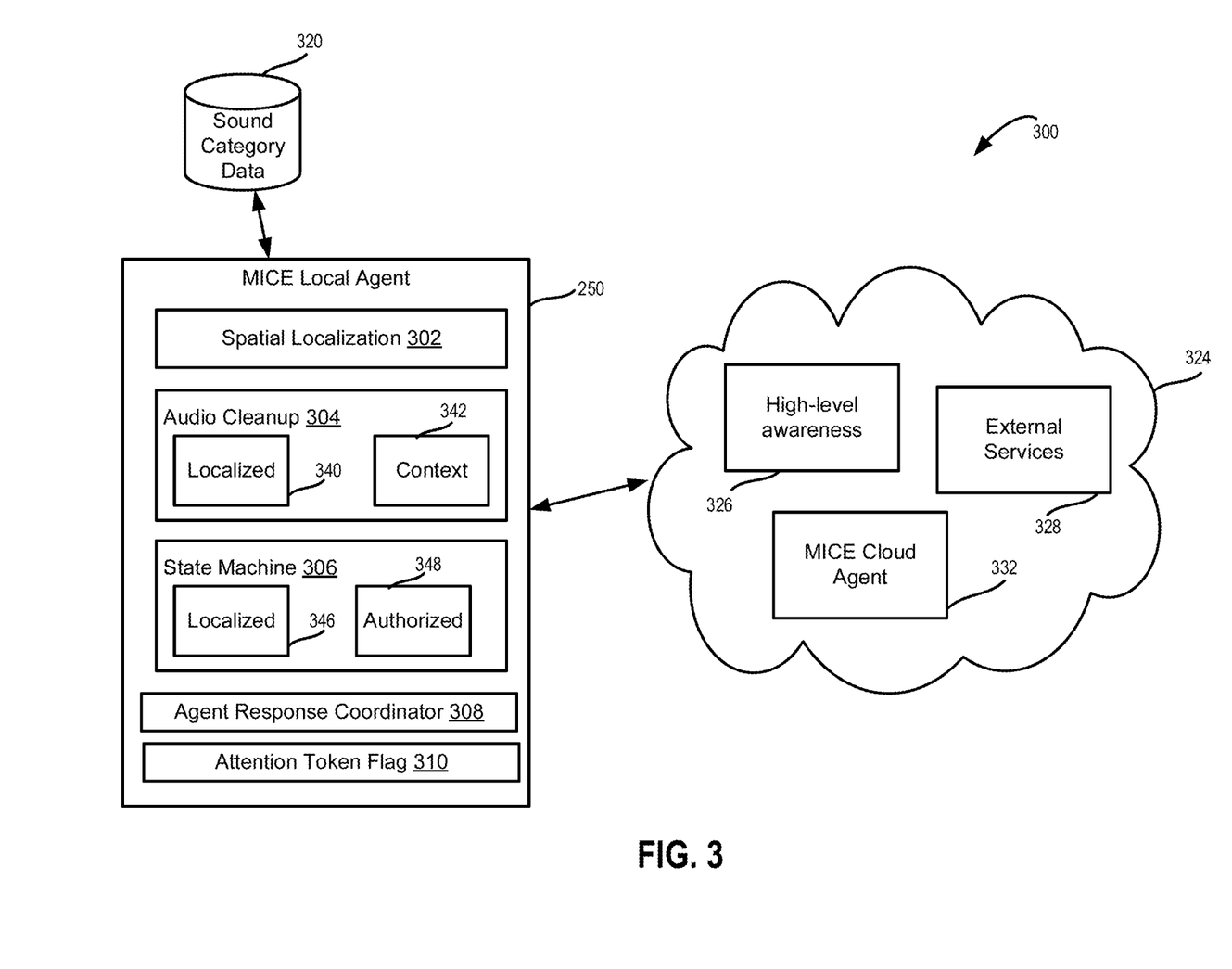
FIG. 3 is a block diagram depicting a system for a multi-agent input coordination environment according to some aspects of the present disclosure.

FIG. 3 is a block diagram depicting an example of a system 300 for multi-agent input coordination according to some aspects of the present disclosure. Local agent 250 in smart device 102 on premises 100 includes spatial localization module 302, audio cleanup module 304, state machine 306, agent response coordinator 308, and attention token flag 310. Agent 250 is connected to stored sound category data 320 and external network 324. External network 324 in this example includes a high-level awareness agent 326, external services 328, and a MICE cloud agent 332. Sound category data 320 can be stored in the same non-transitory memory device as agent 250, on a local server, or in external network 324. Other agents in FIG. 1 can include local agents having the same or a similar structure as that described here with respect to local agent 250.

Still referring to FIG. 3, spatial localization module 302 provides localization through advanced use of sound understanding, optionally without explicit optical input as from a camera, or external labels as might be provided by beacons, global positioning system (GPS data) or manual tags. A localized position within a space can be determined via audio cues provided from various agents through agent coordination or using other spatial cues such as Bluetooth beacons or the WLAN signal.

Audio cleanup includes improving signal quality from acoustic collaboration of multiple listeners. A MICE agent can in some aspects identify simultaneous audio requests and specify where that request should be honored for high-quality understanding. The MICE agent can use passive observation to record a feed and cancel out noise on a secondary feed. Alternatively, strong signals in some areas may cause the agent to always reject commands (e.g. no agent should listen to sounds that originate in a bedroom).

Continuing with FIG. 3, audio cleanup module 304 includes localized data 340 and context data 342. Localized data 340 describes where the particular agent is working on the premises and specifies audio enhancement routines. For example, a tile bathroom or kitchen may produce echoes that obscure audio requests. Context data describes audio enhancement based on removal of conflicting sounds as determined from other agents using the local network mesh and causes the removal of conflicting background sounds from buffered audio. Examples of such conflicting background sounds include users in other rooms, ambient music, and location-wide noise. Agent 250 can, over time, automatically sort ambient sounds into sound categories stored as sound category data 320, and audio cleanup module 304 can use the sound categories to provide audio cleanup.

State machine 306 of agent 250 in FIG. 3 includes localized data 346 and authorized data 348. In addition to setting a current state based on previous audio requests and previous actions taken, a determination between multiple possible states can at least in part take into account localized data 346 that describes or depends on where an agent is located on the premises. Sound category data 320 can also inform the state machine's determination of a current state. Authorized data 348 describes who is authorized to provide audio requests, where certain audio requests are authorized, or both.

Continuing with FIG. 3, agent response coordinator 308 determines at which of the agents to actively process a selected audio request. In some aspects, active processing of a request means to honor the request by programmatically taking action or seeking to take action, as distinct from processing that may be carried out by one or more agents to localize the request. Agent response coordinator 308 may cause the smart device to actively process the request locally, or it may determine that another agent should honor the request and communicate that decision to the appropriate agent over the local network mesh. Attention token flag 310 is alternatively set to a value that represents either an activated or an inactivated attention token for the smart device at which agent 250 is operating. An agent can metaphorically grab an attention token to cue a user as to which agent is expecting to act on a request by displaying an indication such as a flashing LED. The user can then move nearer to another smart device if a correction is needed.

External network 324 of FIG. 3 includes high-level awareness 326. High-level awareness 326 is a module that optionally runs in the cloud to store and provide configuration information to smart device agents on the premises. It can provide some of the same functions as a MICE agent remotely. In this example, the functions are connected with such things as master user authorization and approximate location in order to eliminate the need to have local agents manage these functions. External services 328 are all the services typically provided to smart devices that are related to location awareness, including in some examples, GPS services. MICE cloud agent 332 duplicates the functions of local agents such as local agent 250. MICE cloud agent 332 can provide these functions remotely to older smart devices without a fully capable local agent, or can provide them remotely when a user does not wish to enable the local agent or the local agent cannot function due to technical issues. The functions of a MICE agent as described herein can be provided locally, by the network cloud, or by a combination of both.

Figure 4:
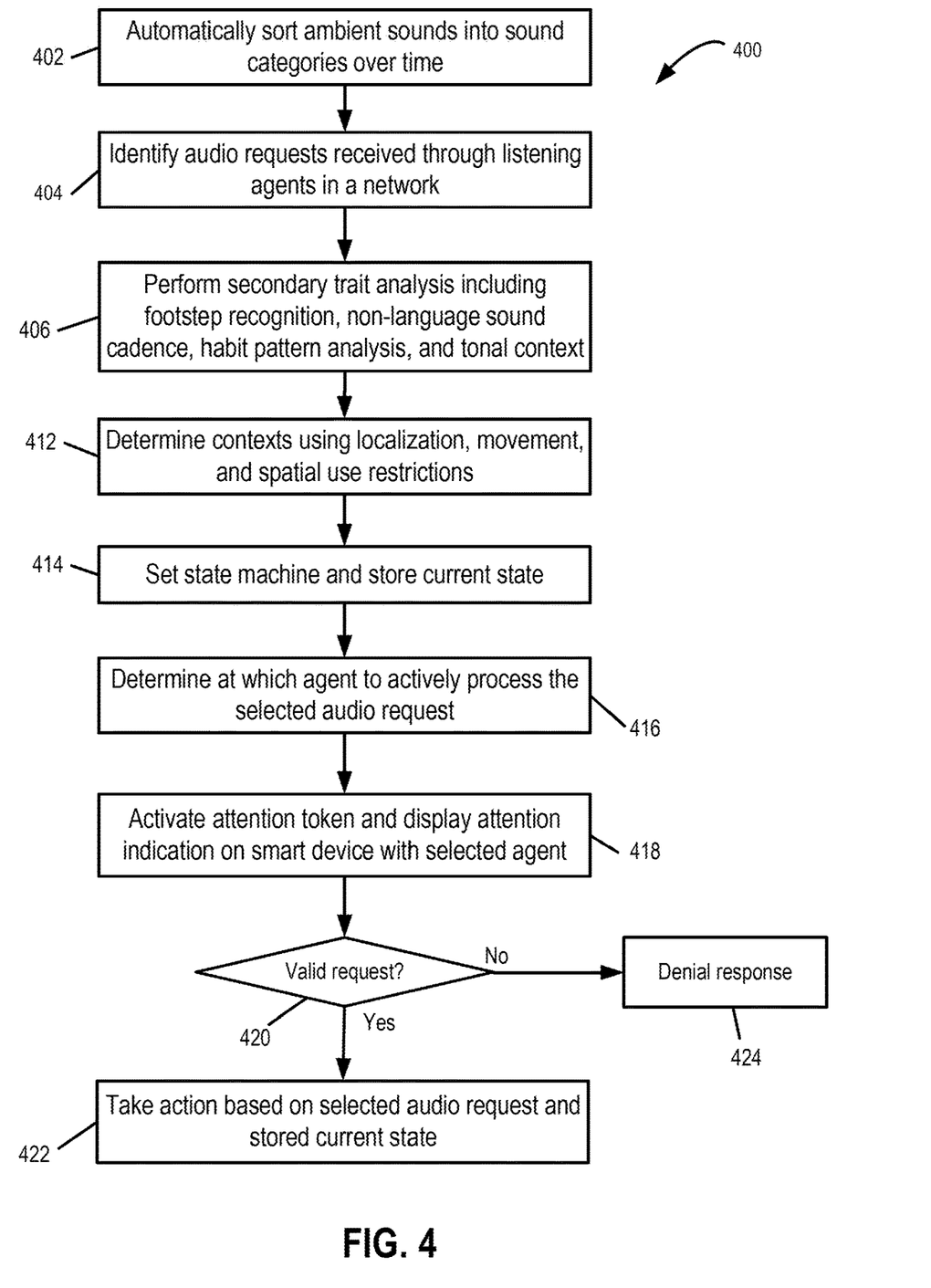
FIG. 4 is a flowchart illustrating a process for providing multi-agent input coordination according to some aspects of the present disclosure.

FIG. 4 is a flowchart illustrating a process 400 for providing multi-agent input coordination according to some aspects of the present disclosure. At block 402, processor 204 automatically sorts ambient sounds into sound categories over time and the resulting sound category data is stored. At block 404, processor 204 identifies audio requests received through listening agents in the network. At block 406, processor 204 performs secondary trait analysis including footstep recognition, non-language sound cadence, habit pattern analysis, and tonal context to indicate urgency, mood, tone, etc. Non-language sound cadence can include the cadence of groans, shouts, breaths, or sighs. Habit patterns include phrases and sounds uttered frequently such as saying the word okay at the beginning of sentences. The local agent can also use this information to frame context query responses, such as a quiet query mode to have a calming effect or a happy mode when appropriate.

At block 412 of FIG. 4, processor 204 determines contexts such as location context and person interaction context using localization, movement, and spatial use restrictions. Determining location context or person interaction context can include identification of individuals within the relevant space. Determining location context can also include triangulation and network features such as GPS, echolocation, visual identification and voiceprint recognition. Location context can also include detecting user groups that may be participating in a multi-player social experience. With such an arrangement, processor 204 executing agent 250 can localize generic requests to the appropriate agents. Localizing a request can include determining, for example, where an audio request such as, turn on light, applies. Such an audio request might apply near an entry door instead of at a desk or in the kitchen.

Still referring to FIG. 4, state machine 306 run by processor 204 is set to its current state at block 414 and the current state is stored in memory, for example, in RAM 211. At block 416, processor 204 executes the agent response coordinator 308 to determine at which agent (or agents) to actively process a selected audio request. At block 418, the attention token is activated and an attention indication is displayed on the smart device corresponding to the selected agent. At block 420, processor 204 determines if the request is valid based on spatial uses for the agent, location context, available connectivity, and other factors such as system-wide restrictions or prohibitions. If the request is valid, at block 422, processor 204 takes action based on the selected audio request and stored current state. If the request is not valid, processor 204 issues a denial response at block 424.

In certain aspects, the system can enforce spatial usage restrictions per agent and optionally restrict functions to specific smart device positioning. For example, the system can prevent a user from telling a dishwasher to start unless the user is near the dishwasher. States or actions within a single space can expire or be restricted. For example, banking requests can only be permitted at a desk, and the permission to issue valid banking requests can be set to expire. States or actions can be limited by the presence of certain individuals. The presence or lack thereof of a specified individual or specified individuals in a location can be referred to as person interaction context. Actions can be taken or restricted (which can be considered an action) based on person interaction context either alone or in combination with other factors. For example, a child can be prevented from turning on a television unless a parent is nearby.

In certain aspects, the system can allow privacy in different areas by removing conflicts between devices. Optionally, the users present near each agent can influence the personal assistant's behavior at that agent. For example, if children are near the agent, the personal assistant can adopt a friendlier or slower speaking voice than when the space is occupied solely by adults. In some aspects the need for passwords or access tokens can be eliminated by the system using user classification and ranking to allow secure access to electronic files or to other computer resources.

In certain aspects, agents can cooperator to accomplish system-wide updates of changing characteristics of users (visual, audio, etc.) to naturally progress the identification of a user to account for aging, growth, etc. Each spatialized agent can adapt different behaviors as appropriate. Smart devices with appropriate smart assistant agents can be carried on the person or embedded in clothing, and joined to the local network mesh as users walk down corridors.

Unless specifically stated otherwise, throughout this specification terms such as "processing," "computing," "determining," "identifying," or the like refer to actions or processes of a computing device, such as one or more computers or a similar electronic computing device or devices that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The foregoing description of the examples, including illustrated examples, of the subject matter has been presented only for the purpose of illustration and description and is not intended to be exhaustive or to limit the subject matter to the precise forms disclosed. Numerous modifications, adaptations, and uses thereof will be apparent to those skilled in the art without departing from the scope of this subject matter. The illustrative examples described above are given to introduce the reader to the general subject matter discussed here and are not intended to limit the scope of the disclosed concepts.

The invention claimed is:

1. A system comprising:
a wireless communication interface;
a processor communicatively coupled to the wireless communication interface, wherein the processor is configured to perform operations comprising:
identifying a selected audio request based on audio requests received through a plurality of agents in a network; and
determining a selected agent of the plurality of agents to actively process the selected audio request, wherein the determining the selected agent is based on secondary trait analysis, wherein the secondary trait analysis includes footstep recognition for determining user urgency, wherein the selected agent utilizes the footstep recognition to frame a query response, wherein the query response is in a quiet query mode for providing a calming effect in a first case where the calming effect is to be provided based on the footstep recognition, wherein the query response is in a different mode for providing a different effect in a second case where the different effect is to be provided based on the footstep recognition, wherein the selected agent is subject to a spatial usage restriction, wherein the spatial usage restriction permits the selected agent to process a particular audio request that is received by the selected agent and that includes a command to control a particular device located at a particular location, if a user corresponding to the particular audio request is determined to be situated at or proximate to the particular location at which the particular device is located, wherein the spatial usage restriction prevents the selected agent from processing the particular audio request, if the user corresponding to the particular audio request is determined not to be situated at or proximate to the particular location at which the particular device is located, wherein the selected agent is different from the particular device, wherein the audio requests include simultaneous audio requests received through at least two agents of the plurality of agents or at least two differing audio requests received from different requesters, and wherein no agent of the plurality of agents is permitted to process any user commands that are determined to be above a particular signal strength and that are determined to originate from a certain location.

2. The system of claim 1, wherein the secondary trait analysis further includes at least one of location context, person interaction context, non-language-sound cadence, habit pattern analysis, or tonal context, wherein the operations further comprise progressively updating a function for identifying the user to account for a changing characteristic of the user, and wherein the changing characteristic comprises a changing audio characteristic of the user due to aging of the user.

3. The system of claim 2, wherein the location context includes at least one of localization or movement, wherein the selected agent is configured to differentiate between presence of adults and presence of children, wherein the selected agent is configured to adapt audio speech, for output in response to the audio requests, based on whether a child is detected in proximity to the selected agent, and wherein the selected agent is configured to modify the audio speech, by decreasing an output speed of the audio speech and adjusting a tone of the audio speech to a first tone that is adapted for children, when the child is detected in proximity to the selected agent, such that the audio speech is friendlier or slower than when only adults are detected in proximity to the selected agent.

4. The system of claim 1, the operations further comprising:
activating an attention token at the selected agent of the plurality of agents; and
displaying an indication of the attention token at the selected agent of the plurality of agents.

5. The system of claim 2, the operations further comprising:
automatically sorting ambient sounds into sound categories; and
using the sound categories to provide the location context for determining the selected agent of the plurality of agents.

6. The system of claim 1, wherein the operations further comprise running a state machine, the system further comprising a non-transitory computer-readable medium communicatively coupled to the processor, the non-transitory computer-readable medium storing a state of the state machine based on at least one of a previous audio request and a previous action, wherein the running the state machine comprises determining whether the state machine is permitted to transition from occupying a first state to occupying a second state based at least in part on localized data that specifies positioning of a corresponding agent of the plurality of agents in a premises.

7. The system of claim 6, wherein the operations further comprise taking an action based on both the selected audio request and the state.

8. A method comprising:
identifying, by a processor, a selected audio request based on audio requests received through a plurality of agents in a network; and
determining, by the processor, a first agent of the plurality of agents to actively process the selected audio request, wherein the determining the first agent is based on secondary trait analysis, wherein the secondary trait analysis includes footstep recognition for determining user urgency, wherein the first agent utilizes the footstep recognition to frame a query response, wherein the query response is in a quiet query mode for providing a calming effect in a first case where the calming effect is to be provided based on the footstep recognition, wherein the query response is in a different mode for providing a different effect in a second case where the different effect is to be provided based on the footstep recognition, wherein the first agent is subject to a spatial usage restriction, wherein the spatial usage restriction permits the first agent to process a particular audio request that is received by the first agent and that includes a command to control a particular device located at a particular location, if a user corresponding to the particular audio request is determined to be situated at or proximate to the particular location at which the particular device is located, wherein the spatial usage restriction prevents the first agent from processing the particular audio request, if the user corresponding to the particular audio request is determined not to be situated at the particular location at which the particular device is located, wherein the first agent is different from the particular device, wherein the audio requests include simultaneous audio requests received through at least two agents of the plurality of agents or at least two differing audio requests received from different requesters, and wherein no agent of the plurality of agents is permitted to process any user commands that are determined to be above a particular signal strength and that are determined to originate from a certain location.

9. The method of claim 8, wherein the secondary trait analysis further includes at least one of location context, person interaction context, non-language-sound cadence, habit pattern analysis, or tonal context.

10. The method of claim 9, wherein the location context includes at least one of localization or movement, wherein the first agent is configured to differentiate between presence of adults and presence of children, wherein the first agent is configured to adapt audio speech, for output in response to the audio requests, based on whether a child is detected in proximity to the first agent, and wherein the first agent is configured to modify the audio speech, by decreasing an output speed of the audio speech and adjusting a tone of the audio speech to a first tone that is adapted for children, when the child is detected in proximity to the first agent, such that the audio speech is friendlier or slower than when only adults are detected in proximity to the first agent.

11. The method of claim 8 further comprising:
activating an attention token at the first agent of the plurality of agents; and
displaying an indication of the attention token at the first agent of the plurality of agents.

12. The method of claim 8 further comprising:
automatically sorting ambient sounds into sound categories; and
using the sound categories to provide location context for determining the first agent of the plurality of agents.

13. The method of claim 8 further comprising:
running a state machine; and
storing a state of the state machine based on at least one of a previous audio request and a previous action.

14. The method of claim 13 further comprising taking an action based on both the selected audio request and the state.

15. A non-transitory computer-readable medium that includes instructions that are executable by a computing device for causing the computing device to perform operations for multi-agent input coordination, the operations comprising:
identifying a selected audio request based on audio requests received through a plurality of agents in a network; and
determining a selected agent of the plurality of agents to actively process the selected audio request, wherein the determining the selected agent comprises determining the selected agent using secondary trait analysis, wherein the secondary trait analysis includes footstep recognition for determining user urgency, wherein the selected agent utilizes the footstep recognition to frame a query response, wherein the query response is in a quiet query mode for providing a calming effect in a first case where the calming effect is to be provided based on the footstep recognition, wherein the query response is in a different mode for providing a different effect in a second case where the different effect is to be provided based on the footstep recognition, wherein the selected agent is associated with a spatial usage restriction, wherein the spatial usage restriction permits the selected agent to process a particular audio request that is received by the selected agent and that includes a command to control a particular device located in a particular area, if a user corresponding to the particular audio request is determined to be situated in or proximate to the particular area in which the particular device is located, wherein the spatial usage restriction prevents the selected agent from acting upon the particular audio request, if the user corresponding to the particular audio request is determined not to be situated in the particular area in which the particular device is located, wherein the selected agent is different from the particular device, and wherein the audio requests include at least one of simultaneous audio requests received through at least two agents of the plurality of agents or at least two differing audio requests received from different requesters, and wherein no agent of the plurality of agents is permitted to process any user commands that are determined to be above a particular signal strength and that are determined to originate from a certain location.

16. The non-transitory computer-readable medium of claim 15, wherein the secondary trait analysis further includes at least one of location context, person interaction context, non-language-sound cadence, habit pattern analysis, or tonal context.

17. The non-transitory computer-readable medium of claim 16, wherein the location context includes at least one of localization or movement, wherein the selected agent is configured to differentiate between presence of adults and presence of children, wherein the selected agent is configured to adapt audio speech, for output in response to the audio requests, based on whether a child is detected in proximity to the selected agent, and wherein the selected agent is configured to modify the audio speech, by decreasing an output speed of the audio speech and adjusting a tone of the audio speech to a first tone that is adapted for children, when the child is detected in proximity to the selected agent, such that the audio speech is friendlier or slower than when only adults are detected in proximity to the selected agent.

18. The non-transitory computer-readable medium of claim 15, the operations further comprising:
activating an attention token at the selected agent of the plurality of agents; and
displaying an indication of the attention token at the selected agent of the plurality of agents.

19. The non-transitory computer-readable medium of claim 15, the operations further comprising:
automatically sorting ambient sounds into sound categories; and
using the sound categories to provide location context for determining the selected agent of the plurality of agents.

20. The non-transitory computer-readable medium of claim 15 the operations further comprising:
  running a state machine;
  storing a state of the state machine based on at least one of a previous audio request and a previous action; and
  taking an action based on both the selected audio request and the state.

\* \* \* \* \*